(12) United States Patent
Nakata et al.

(10) Patent No.: US 7,821,396 B2
(45) Date of Patent: Oct. 26, 2010

(54) IMAGE FORMING DEVICE AND RECORDING SHEET SELECTION METHOD THEREFOR

(75) Inventors: Hironobu Nakata, Itami (JP); Kenji Matsuhara, Kawanishi (JP); Toshihiko Otake, Nishinomiya (JP); Yoshiki Tokimoto, Nishiwaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 303 days.

(21) Appl. No.: 11/505,996

(22) Filed: Aug. 18, 2006

(65) Prior Publication Data

US 2007/0194098 A1    Aug. 23, 2007

(30) Foreign Application Priority Data

Feb. 21, 2006 (JP) .............................. 2006-44357

(51) Int. Cl.
    G08B 13/14 (2006.01)
(52) U.S. Cl. .................. 340/572.1; 235/375; 358/3.28; 399/80; 399/366; 705/57
(58) Field of Classification Search .............. 340/572.1, 340/679; 101/2; 399/80, 366, 38, 75, 82, 399/85; 358/1.15; 235/375
    See application file for complete search history.

(56) References Cited

U.S. PATENT DOCUMENTS 7,170,286 B2 *  1/2007  Takahashi et al. ........... 324/228

| | | | |
|---|---|---|---|
| 7,295,790 B2 * | 11/2007 | Morimoto et al. | 399/80 |
| 2005/0168766 A1 * | 8/2005 | Troyansky et al. | 358/1.14 |
| 2005/0200910 A1 * | 9/2005 | Kanoshima et al. | 358/448 |

FOREIGN PATENT DOCUMENTS

| JP | 5-88428 | 4/1993 |
|---|---|---|
| JP | 2001-197297 | 7/2001 |
| JP | 2004-202068 | 7/2004 |
| JP | 2004-228897 | 8/2004 |
| JP | 2005-031153 | 2/2005 |
| JP | 2005-059577 | 3/2005 |
| JP | 2005-205729 | 8/2005 |
| JP | 2005-208098 | 8/2005 |
| JP | 2006-007674 | 1/2006 |

OTHER PUBLICATIONS

Japanese Office Action mailed on Dec. 9, 2008 directed towards counterpart foreign application No. 2006-044357; 6 pages.
Japanese Office Action mailed on Jun. 23, 2009 directed at application No. 2006-044357; 8 pages.

* cited by examiner

Primary Examiner—Brent Swarthout
(74) Attorney, Agent, or Firm—Morrison & Foerster LLP

(57) ABSTRACT

An image forming device including a document tag reader that detects a contactless IC tag (document tag) attached to the document. If the document tag reader detects a document tag attached to a document, the tagged document is recognized as having a high management level, and a tagged recording sheet is fed (selected) from a sheet tray storing tagged recording sheets to which a contactless IC tag (sheet tag) is attached. On the other hand, if the document tag reader does not detect a document tag, the document is recognized as having a low management level, and a not-tagged recording sheet is fed (selected) from a sheet tray storing not-tagged recording sheets to which a contactless IC tag (sheet tag) is not attached.

6 Claims, 13 Drawing Sheets

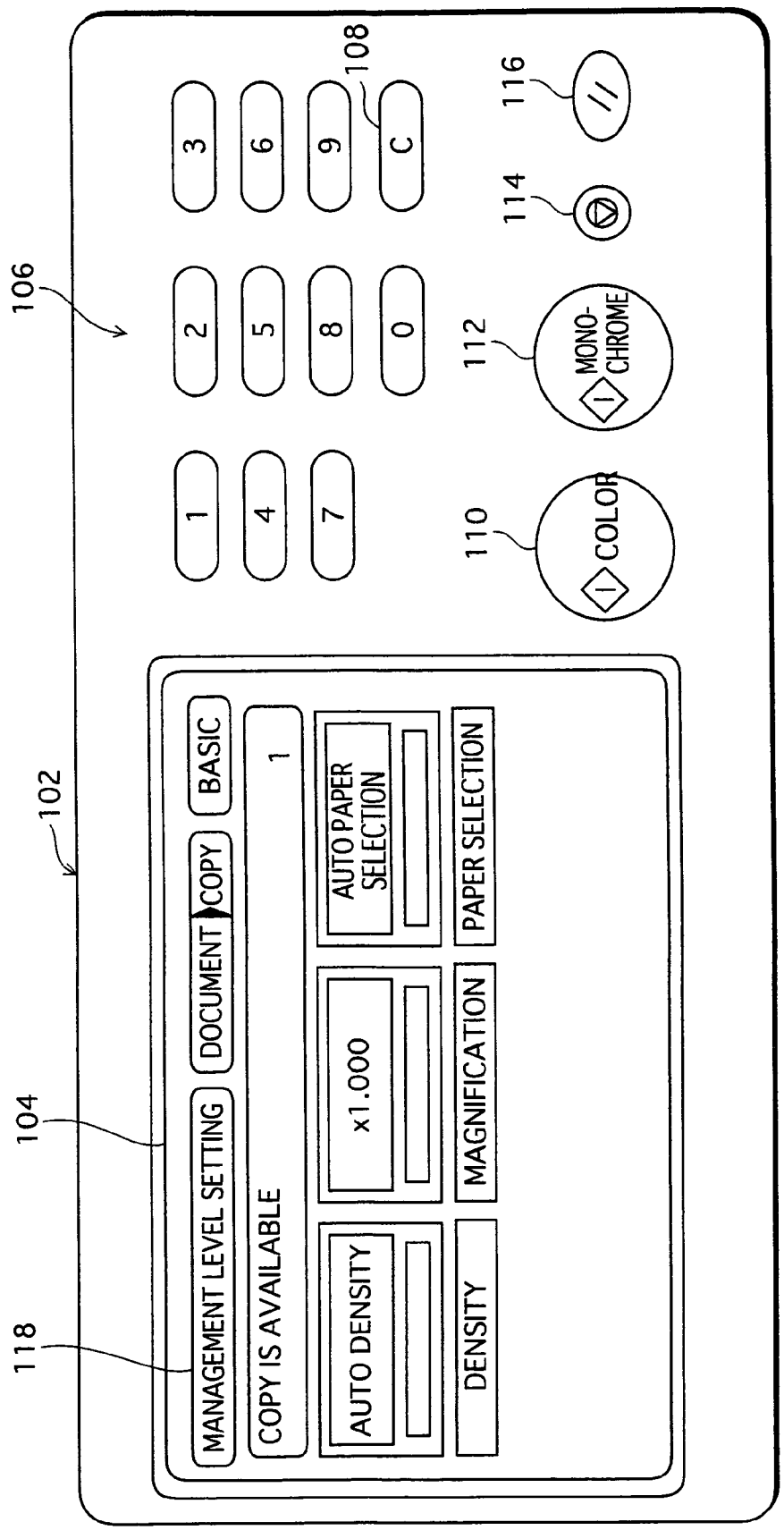

IMAGE FORMING DEVICE AND RECORDING SHEET SELECTION METHOD THEREFOR

This application is based on application No. 2006-44357 filed in Japan, the contents of which are hereby incorporated by reference.

BACKGROUND OF THE INVENTION (1) Field of the Invention

The present invention relates to an image forming device, and more specifically, to an image forming device that reads out an image from a document managed by management level information and forms the read-out image onto a recording sheet, and relates to a recording sheet selection method for the image forming device.

(2) Description of the Related Art

Use of contactless IC tag as a means for managing the document security has been studied by business organizations and the like. More specifically, according to a technology, the document security is managed by using a contactless IC tag embedded in the document, where the contactless IC tag stores management level information which has conventionally been represented by a sign "FOR INTERNAL USE ONLY" or "CONFIDENTIAL" stamped on the document.

This technology produces such an advantageous effect that documents are clean and easy to see since information (such as "FOR INTERNAL USE ONLY") that is irrelevant to the contents of the documents is eliminated. Also, by installing an IC tag reader in an entrance of a building or a room in which security-target documents are stored, it is possible to check documents when they pass the entrance, to prevent the documents from being taken out in an unauthorized manner.

Meanwhile, when a document embedded with a contactless IC tag is copied by an image forming device, it is necessary to pass (succeed) the management level information from the document to a recording sheet. For this reason, when a document embedded with a contactless IC tag is copied by an image forming device, the management level information needs to be read out from the contactless IC tag embedded in the document and written into a contactless IC tag embedded in a recording sheet.

Also, when a document is newly managed for security using the contactless IC tag, it may be necessary to copy an image from the document to a recording sheet embedded with a contactless IC tag, and write the management level information to the contactless IC tag embedded in the recording sheet.

In principle, an image forming device stores ordinary recording sheets that do not have such tags, as well as recording sheets embedded with the contactless IC tag. It is therefore necessary to select, in an assured manner, a recording sheet embedded with a contactless IC tag to perform the above-described process. On the other hand, when an ordinary document (a document at a low management level) is copied, it is necessary to select an ordinary recording sheet. That is to say, it is necessary to select a recording sheet depending on the management level of the document.

Japanese Patent Application Publication No. 2005-208098 discloses an image forming device that includes (a) an operation panel on which it is possible to set the device to be restricted to use only a recording sheet embedded with a contactless IC tag when a copy is performed, and to cancel the setting, and (b) an IC tag reader that is disposed at a midway position in the transport path from the sheet tray and the image forming means. In this image forming device, the image forming means is stopped from forming (copying) an image when the above-mentioned restriction on the recording sheet for use has been set on the operation panel, and when the IC tag reader does not read out any information from a recording sheet fed out from the sheet tray (that is to say, when recording sheets attached with no contactless IC tag are stored in the sheet tray).

Such a construction prevents, with a considerable degree of reliability, a case where a document with high management level, which should be copied onto a recording sheet attached with a contactless IC tag, is copied onto a recording sheet attached with no contactless IC tag by mistake.

However, in the image forming device recited in Japanese Patent Application Publication No. 2005-208098, it may happen that if the above-mentioned setting has been cancelled on the operation panel, a document with low management level, which should be copied onto a recording sheet attached with no contactless IC tag, is copied onto a recording sheet attached with a contactless IC tag. Since a recording sheet attached with a contactless IC tag is more expensive than a recording sheet attached with no contactless IC tag, such copying leads to unnecessary increase in the office expense. Also, in the image forming device recited in Japanese Patent Application Publication No. 2005-208098, even a document with high management level is unconditionally copied if the setting has been cancelled. This is a problem for security.

SUMMARY OF THE INVENTION

According to an aspect of the present invention, an image forming device for reading out an image from a document and forming the read-out image on a recording sheet, comprises: a management level information acquiring unit operable to acquire management level information of the document; a storing unit operable to separately store different types of recording sheets that respectively correspond to different document management levels; and a recording sheet selecting unit operable to select, in accordance with the management level information acquired by the management level information acquiring unit, a type of recording sheet on which an image is to be formed, from among the recording sheets stored in the storing unit.

With the above-stated construction, the management level information of the document is acquired, and a type of recording sheet is selected for image formation in correspondence with a document management level indicated by the management level information, from among the different types of recording sheets that respectively correspond to different document management levels and are stored in the storing unit. This achieves an appropriate selection of a recording sheet in accordance with the document management level.

In the above-described image forming device, the management level information acquiring unit may include a receiving unit operable to receive, from a user, management level information of the document, and acquires the management level information of the document via the receiving unit.

With the above-stated construction, the user can determine the document management level.

In the above-described image forming device, the document may be assigned with one of management levels that differ depending on whether the document is a tagged document attached with a contactless IC tag or a not-tagged document that is not attached with a contactless IC tag, and the management level information acquiring unit may include a document tag detecting unit operable to detect whether or not a contactless IC tag is attached to the document, and acquire a result of the detection by the document tag detecting unit as the management level information of the document.

With the above-stated construction, a type of recording sheet is selected for image formation in correspondence with a document management level that is determined depending on whether the document is a tagged document or a not-tagged document. This excludes human errors that may occur in selecting a type of recording sheet.

In the above-described image forming device, the storing unit may store two types of recording sheets: a tagged recording sheet attached with a contactless IC tag; and a not-tagged recording sheet that is not attached with a contactless IC tag, the document tag detecting unit further has a function to read out tag information from a contactless IC tag attached to the tagged document, and the image forming device further comprises a tag information writing unit operable to, if the recording sheet selecting unit selects a tagged recording sheet, write the tag information read out by the document tag detecting unit to a contactless IC tag attached to the selected tagged recording sheet.

With the above-stated construction, the tag information is passed (succeeded) from the contactless IC tag attached to the tagged document to the contactless IC tag attached to the tagged recording sheet on which the image from the tagged document is formed.

In the above-described image forming device, the document may be assigned with one of management levels that differ depending on whether the document is a tagged document attached with a contactless IC tag or a not-tagged document that is not attached with a contactless IC tag, the management level information acquiring unit includes: a receiving unit operable to receive, from a user, management level information of the document; and a document tag detecting unit operable to detect whether or not a contactless IC tag is attached to the document, and the management level information acquiring unit acquires a result of the detection by the document tag detecting unit as the management level information of the document, regardless of a result of the reception by the receiving unit.

With the above-stated construction, even if the user erroneously recognizes a tagged document as a not-tagged document, the detection result of the document tag detecting unit is prioritized. This reduces erroneous selections of a recording sheet.

In the above-described image forming device, the storing unit may store, respectively in different trays, two types of recording sheets: a tagged recording sheet attached with a contactless IC tag; and a not-tagged recording sheet that is not attached with a contactless IC tag, and the recording sheet selecting unit includes a sheet tag detecting unit operable to detect whether or not a contactless IC tag is attached to the recording sheets stored in each sheet tray, and selects the type of recording sheet by referring to a result of the detection by the sheet tag detecting unit.

With the above-stated construction, the user of the image forming device needs not be conscious of which sheet trays store which types of recording sheets, but is only required to store different types of recording sheets in different sheet trays to cause the image forming device to select an appropriate type of recording sheet in accordance with the management level of the document.

According to another aspect of the present invention, a recording sheet selection method for an image forming device includes a storing unit operable to separately store different types of recording sheets that respectively correspond to different document management levels, reads out an image from a document and forms the read-out image on a recording sheet selected from among the recording sheets stored in the storing unit, the recording sheet selection method comprising: a management level information acquiring step for acquiring management level information of the document; and a recording sheet selecting step for selecting, in accordance with the management level information acquired in the management level information acquiring step, a type of recording sheet from among the recording sheets stored in the storing unit.

With the above-stated construction, the management level information of the document is acquired, and a type of recording sheet is selected for image formation in correspondence with a document management level indicated by the management level information, from among the different types of recording sheets that respectively correspond to different document management levels and are stored in the storing unit. This achieves an appropriate selection of a recording sheet in accordance with the document management level.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 5 is a plan view of an operation panel included in the copier;

DESCRIPTION OF THE PREFERRED EMBODIMENT

The following describes an image forming device, which is achieved by a tandem color digital copier as an example, as an embodiment of the present invention.

Figure 1:
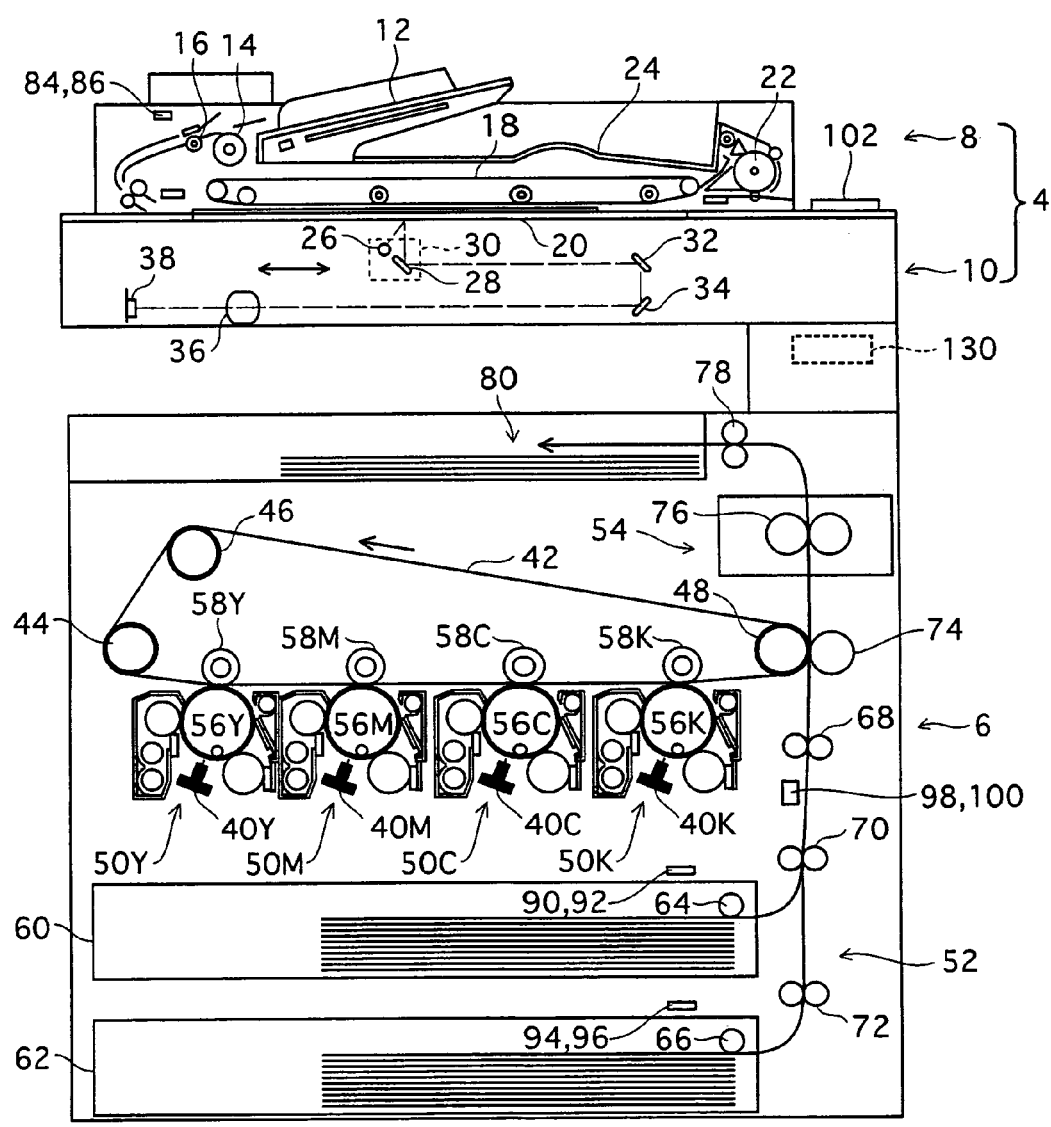
FIG. 1 is an outline configuration diagram of a copier in the embodiment.

FIG. 1 is an outline configuration diagram of a tandem color digital copier 2 (hereinafter merely referred to as copier 2) in the present embodiment.

The copier 2 is roughly composed of an image reader unit 4 for reading out an image from a document, and a printer unit 6 for reproducing the image, which was read out by the image reader unit 4, by printing out the image onto a recording sheet.

The image reader unit 4 includes an auto document feeder (hereinafter referred to as "ADF") 8 and a scanner 10.

The ADF 8 causes a pickup roller 14 and a separation roller 16 to transport a document set on a document tray 12 one sheet at a time downward, allowing the document sheet to be transported by a transport belt 18 to a document reading position on a platen glass 20. After an image is readout from the document sheet at the position, the ADF 8 transports the document sheet towards the right-hand side in the drawing by the transport belt 18, and the sheet of document is ejected by an ejection roller 22 into a document stack unit 24.

The scanner 10 includes a carriage 30 in which an exposure lamp 26 and a mirror 28 are embedded, where the exposure lamp 26 emits light onto the sheet of document, and the mirror 28 changes the path of the light reflected on the document into a direction that is in parallel with the platen glass 20. The scanner 10 scans the document on the platen glass 20 by causing the carriage 30 to move in the direction indicated by the arrow in the drawing. The light reflected on the document is further reflected on the mirror 28, and then reflected on the mirrors 32 and 34, and then guided into a CCD color image sensor (hereinafter merely referred to as "CCD sensor") 38 via a condenser lens 36. The CCD sensor 38 generates image data by converting the guided reflected light into electric signals.

The image data obtained by the photoelectric conversion of the CCD sensor 38 is subjected to various data processes such as the shading performed by an image processing unit 136 (FIG. 7) of a control unit 130, as will be described later, and then converted into image data with reproduction colors of yellow (Y), magenta (M), cyan (C), and black (K). Hereinafter, the reproduction colors yellow, magenta, cyan, and black are represented as Y, M, C, and K, respectively, and the Y, M, C, and K will be added to the reference numbers of the elements related to the colors.

The image data of each reproduction color is stored in an image-processing-dedicated data recording unit 140 (FIG. 7), which will be described later, of the control unit 130, for each reproduction color. The image data stored in the image-processing data recording unit 140 is read out at a predetermined timing in synchronization with the supply of a recording sheet, on a basis of one scan line at a time, and the read-out image data becomes a drive signal for a corresponding one of LED arrays 40Y-40K.

The printer unit 6 forms an image by a known electrophotography method, and includes a transfer belt 42, a drive roller 44, a passive roller 46, a backup roller 48 (the three rollers suspending the transfer belt 42), image forming units 50Y-50K arranged at regular intervals one by one in the stated order of Y, M, C, K to face the transfer belt 42, along a direction in which the transfer belt 42 runs, a paper feed unit 52 for feeding the recording sheets, and a fixing unit 54.

The image forming units 50Y-50K respectively include photosensitive drums 56Y-56K being image carriers. LED arrays 40Y-40K for exposure-scanning the surface of the photosensitive drums 56Y-56K, an electrostatic charger, a developer, a cleaner (these components are known and have no reference numbers), and primary transfer rollers 58Y-58K.

Figure 7:
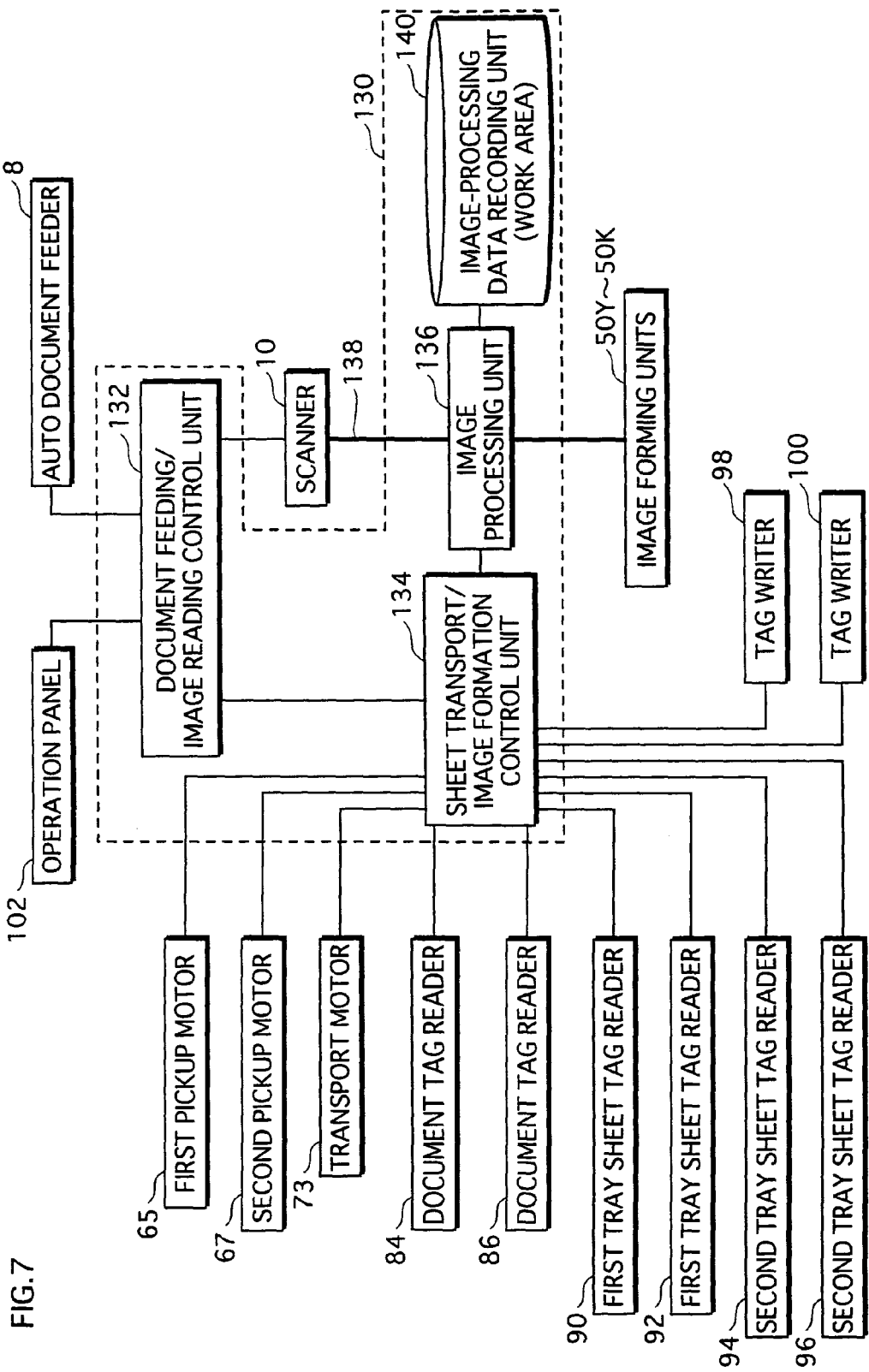
FIG. 7 is a block diagram showing the construction of a control unit included in the copier.

The paper feed unit 52 includes a first sheet tray 60 and a second sheet tray 62 which are examples in the present embodiment of a plurality of trays that store different types of recording sheets, respectively. The paper feed unit 52 also includes a first pickup roller 64 and a second pickup roller 66 for picking up the recording sheets respectively from the first sheet tray 60 and the second sheet tray 62, and a first transport roller 68, a second transport roller 70, and a third transport roller 72 for transporting the picked-up recording sheets to a secondary transfer roller 74. It should be noted here that the first pickup roller 64 is driven by a first pickup motor 65 (FIG. 7), and the first transport roller 68, second transport roller 70, and third transport roller 72 are driven by a transport motor 73 (FIG. 7). The types of the recording sheets will be described later.

The photosensitive drums 56Y-56K are cleaned by the cleaner such that the remnant toner is removed from the surface and are uniformly charged by the electrostatic charger before they are exposed to the LED arrays 40Y-40K. When the photosensitive drums 56Y-56K are exposed to the laser beams in the uniformly charged state, static latent images are formed on the surfaces of the photosensitive drums 56Y-56K.

Each of the static latent images is developed by developers that correspond to the colors, so that toner images of Y, M, C, K are formed on the respective surfaces of the photosensitive drums 56Y-56K. Then, the toner images are transferred onto the external surface of the transfer belt 42 one by one at respective transfer positions by the electrostatic action of the primary transfer rollers 58Y-58K, which are arranged on the transfer belt 42 internal surface side.

Here, the image forming operation for each color is executed at the timing that is shifted from the upstream side to the downstream side such that the toner images of respective colors are transferred to be superimposed on the same position of the transfer belt 42 as the belt runs.

The paper feed unit 52 feeds a desired type of recording sheet at timings that match the timings at which the images are formed on the transfer belt 42, to the position at which the secondary transfer roller 74 and the backup roller 48 face each other (hereinafter, the position is referred to as "secondary transfer position").

At the secondary transfer position, the toner images are transferred from the surface of the transfer belt 42 onto the recording sheet (secondary transfer). The secondary transfer roller 74 is a sponge-like, conductive elastic member.

The recording sheet, onto which the toner images have been transferred, is transported to the fixing unit 54 by the transfer belt 42. A fixing roller 76 of the fixing unit 54 has an internal heater (not illustrated). In the fixing unit 54, the recording sheet is given a pressure at a high temperature so that the toner particles on the surface thereof melt and are fixed onto the sheet surface. The recording sheet is then ejected into the ADF 80 by an ejection roller 78.

Figure 2A:
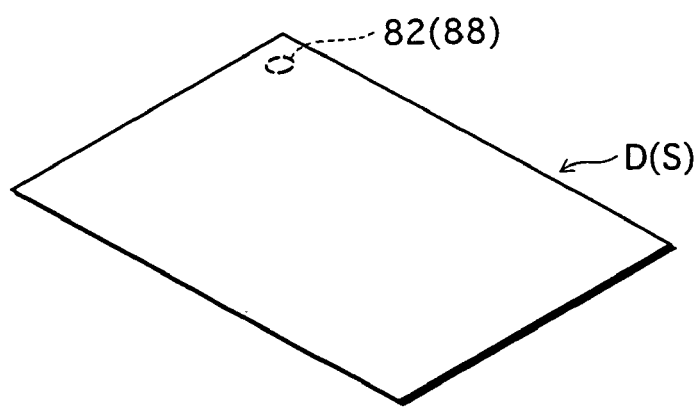
FIG. 2A shows a tagged document or a tagged recording sheet used in the copier.

The copier 2 can read out images from a document D, as shown in FIG. 2A, to which a contactless IC tag 82 is attached, as well as from an ordinary document to which the contactless IC tag 82 is not attached. A document having the contactless IC tag 82 is referred to as "tagged document", and the contactless IC tag 82 is referred to as "document tag 82".

The document tag 82 stores therein information that indicates the management level that is set in accordance with the security level of the document. In the present example, it is presumed that the management information indicating the management level "important" is stored in the document tag 82. The document is managed as management level 1. On the other hand, the ordinary document (hereinafter, also referred to as "not-tagged document") is managed as management level 0, which is lower than the management level in the security level. That is to say, in the present example, the reading-target document is classified into different management levels depending on whether or not a contactless IC tag is attached thereto.

Back to FIG. 1, the ADF 8 is provided with IC tag readers (hereinafter referred to as "document tag readers") 84 and 86 that detect the document tag 82 and read out the management level information from the document tag 82. The document tag readers 84 and 86 are disposed near the document transport path and immediately downward of the separation roller 16. The purpose of disposing the document tag readers 84 and 86 immediately downward of the separation roller 16 is to judge the management level indicating the security level for each sheet of document. As an alternative measure, the document tag reader may be, for example, disposed below the document tray 12 so that the contactless IC tag can be detected from the document set in the document tray 12.

Figure 3:
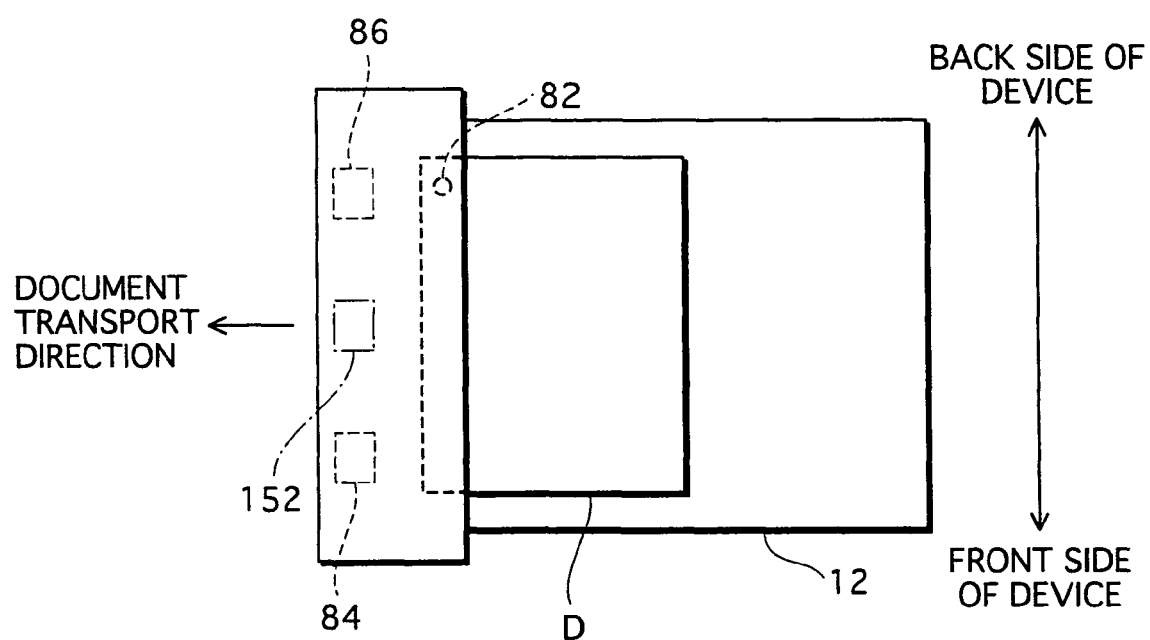
FIG. 3 is a plan view of a part of an ADF included in the copier.

FIG. 3 is a plan view of a part of the ADF 8. FIG. 3 shows a state in which the tagged document D has been set in the document tray 12. Of the two document tag readers, the document tag reader 84 is disposed at the front side of the device, and the document tag reader 86 is disposed at the back side of the device. The reason why the two tag readers are disposed in this way is that the document tag 82 can be detected and the tag information can be read out in both cases where the tagged document D is set with the document tag 82 positioned at the front side of the device and the tagged document D is set with the document tag 82 positioned at the back side of the device.

The document tag readers 84 and 86 have functions to perform a radio communication with the document tag 82 and to read out necessary information therefrom, and have a known construction that includes a transmission/reception antenna and a control IC. The document tag readers 84 and 86 send out a request signal at short regular intervals, and if the document tag 82 enters the radio communication capable area, they receive a response signal for the request signal from the document tag 82 of each sheet of document, they detect the document tag 82 and perform a communication, and send the detection results (whether or not communication is available) and the read-out information to a sheet transport/image formation control unit 134 (FIG. 7), which will be described later.

The copier 2 can form images onto a recording sheet S, as shown in FIG. 2A, to which a contactless IC tag 88 is attached (embedded), as well as onto an ordinary recording sheet (hereinafter referred to as "not-tagged recording sheet") to which the contactless IC tag 88 is not attached. A recording sheet having the contactless IC tag 88 is referred to as "tagged recording sheet", and the contactless IC tag 88 is referred to as "sheet tag 88".

Back to FIG. 1, the tagged and not-tagged recording sheets are stored into the first sheet tray 60 and the second sheet tray 62, respectively. It should be noted here that both types of recording sheets can be stored in any of these trays. The sheet trays are provided with IC tag readers 90, 92, 94, and 96 for detecting whether a recording sheet stored therein is a tagged or not-tagged recording sheet.

Figure 4:
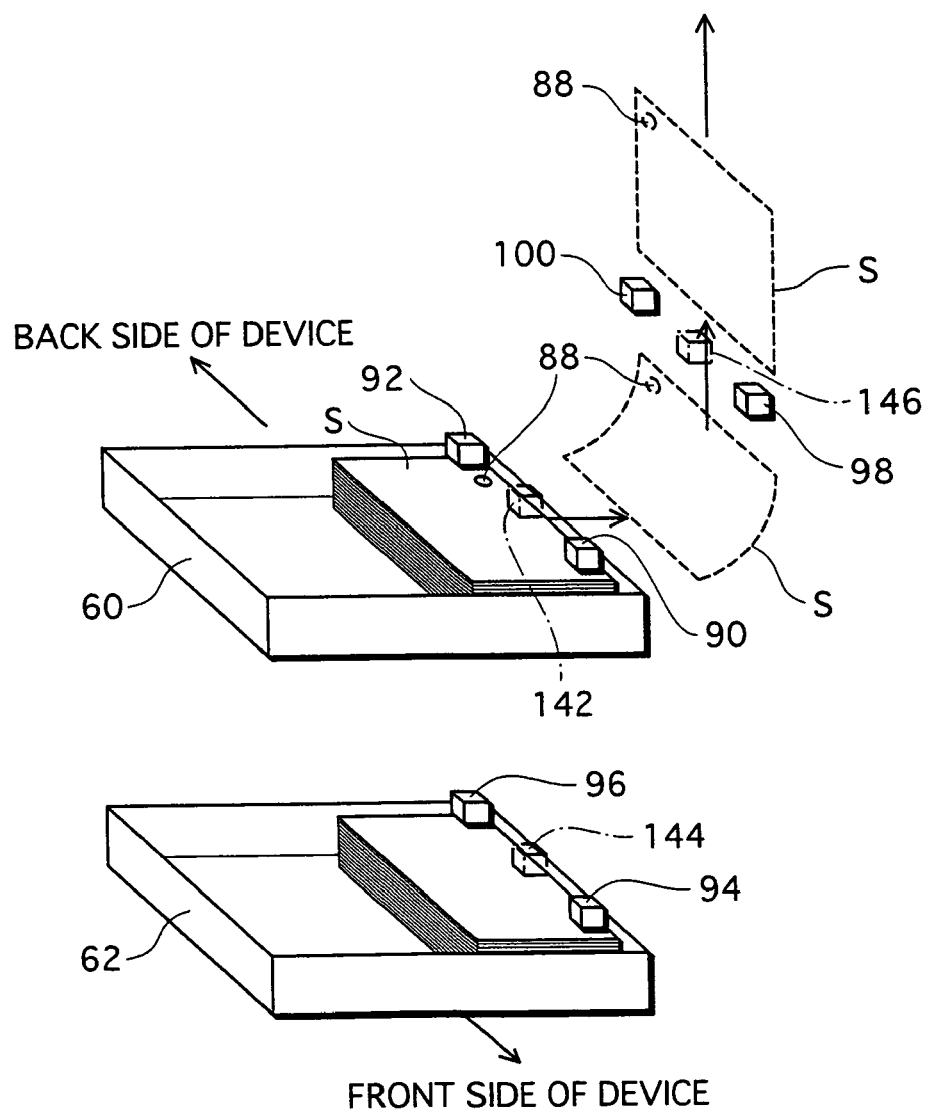
FIG. 4 is a perspective view of a part of a paper feed unit included in the copier.

FIG. 4 is a perspective view of a part of the paper feed unit 52.

As shown in FIG. 4, IC tag readers (hereinafter referred to as "first tray sheet tag readers") 90 and 92 are provided in correspondence with the first sheet tray 60, and IC tag readers (hereinafter referred to as "second tray sheet tag readers") 94 and 96 are provided in correspondence with the second sheet tray 62. The reason why two sheet tag readers are disposed at the device front side and the device back side of each sheet tray is for the same reason with the document tag readers 84 and 86 (FIG. 3). That is to say, the reason is that the sheet tag 88 can be detected in both cases where the tagged recording sheet S is set with the sheet tag 88 in the front side of the device and the tagged recording sheet S is set with the sheet tag 88 in the back side of the device.

In principle, the tagged recording sheet and the not-tagged recording sheet are used as follows. That ipso say, if the reading target document is a tagged document, a tagged recording sheet is used, and if the reading target document is a not-tagged document, a not-tagged recording sheet is used.

The management level information, which has been read out from the document tag 82 of the tagged document D, is written into the sheet tag 88 of the tagged recording sheet S. Here, IC tag writers (hereinafter merely referred to as "tag writers") 98 and 100 are provided to detect the sheet tag 88 and write the management level information into the sheet tag 88.

The tag writers 98 and 100 are disposed near the document transport path and between the first transport roller 68 and the second transport roller 70 (FIG. 1). The reason why the tag writers 98 and 100 are disposed respectively at the front and back side of the device is the same as that for the sheet tag readers, and the explanation is thus omitted here.

It should be noted here that, as will be described later, the device of the present invention can use a tagged recording sheet even for a not-tagged document (ordinary document), and write the management level information into the sheet tag 88 of the tagged recording sheet S to raise the management level thereof for the succeeding management. In such a case, a tagged recording sheet is used even for a not-tagged document.

Back to FIG. 1, the copier 2 has an operation panel 102 on the upper surface thereof at an easy-to-operate location.

FIG. 5 is a plan view of the operation panel 102. The operation panel 102 has a liquid crystal touch panel 104 and a plurality of keys. Displayed on the liquid crystal touch panel 104 are currently set copy condition and copy mode, keys for selecting a copy condition and a copy mode, an error message indicating a paper empty or a paper jam and the like. A numeric keypad 106 is provided to enable the number of copies to be set. A clear key 108 is provided to enable the number of copies to be reset to "1". A color copy start key (hereinafter referred to as "color key") 110 is provided to enable a color copy operation (an operation for reading an image in color from a document, and printing it in color) to be started. A monochrome copy start key (hereinafter referred to as "monochrome key") 112 is provided to enable a monochrome copy operation (an operation for reading an image in monochrome from a document, and printing it in monochrome) to be started. The color key 110 and the monochrome key 112 may be merely referred to as "copy start keys". A stop key 114 is provided to enable the ADF 8 to stop transporting a document (stop reading an image from the document) or to enable a copy operation to be stopped. A panel reset key 116 is provided to enable all copy conditions and modes such as the copy density and the copy magnification, that have been set, to be reset to standard values.

Figure 6A:
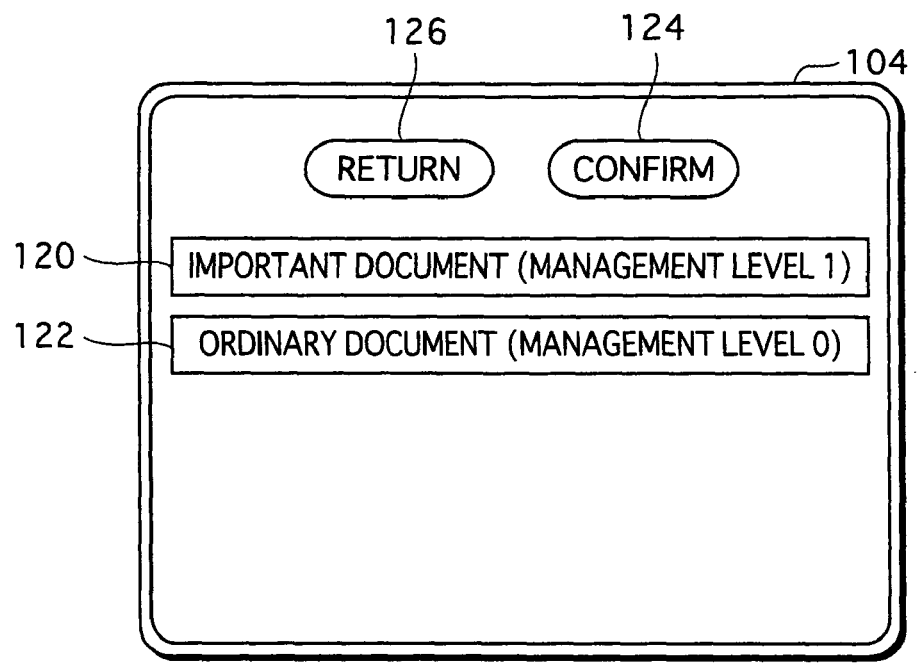
FIG. 6A shows an example of a display screen of a liquid crystal touch panel included in the operation panel.

A management level setting key 118, which is displayed on the basic screen of the liquid crystal touch panel 104, is, as described earlier, selected (pressed) to copy an image from a not-tagged document to a tagged recording sheet and write the management level information into the sheet tag. When the management level setting key 118 is pressed, the screen of the liquid crystal touch panel 104 changes to a display screen as shown in FIG. 6A.

An important document key 120 is selected (pressed) to use a tagged recording sheet and write the management level information "important" into the sheet tag thereof. An ordinary document key 122 is selected (pressed) to use a not-tagged recording sheet. To assign management level "1" to a document from which an image is to be read out, the important document key 120 is selected, and to assign management level "0" to a document from which an image is to be read out, the ordinary document key 122 is selected. In this sense, the operation panel 102 functions as a receiving unit for receiving, from the user, specification of a management level to be assigned to a document from which an image is to be read out.

A confirmation key 124 is used to confirm the selected status of either the important document key 120 or the ordinary document key 122. A return key 126 is used to return the display screen of the liquid crystal touch panel 104 to the basic screen (FIG. 5).

FIG. 7 is a block diagram showing the construction of the control unit 130 of the copier 2.

The control unit 130 includes, as main components, a document feeding/image reading control unit 132, a sheet transport/image formation control unit 134, an image processing unit 136, and an image-processing data recording unit 140.

Figure 8A:
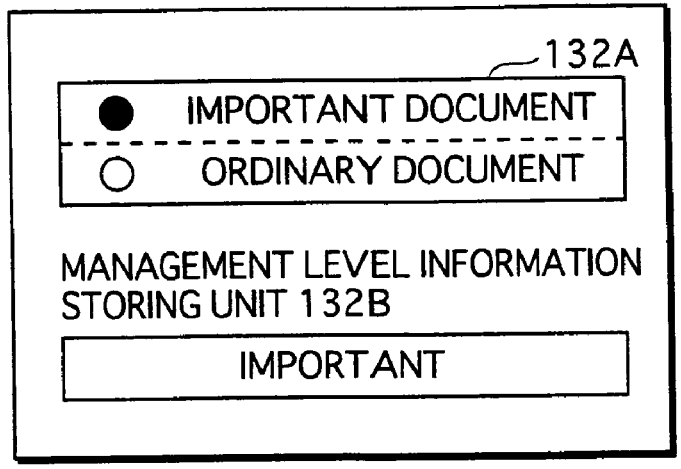
FIG. 8A shows a management level holding unit and a management level information storing unit that are included in a document feeding/image reading control unit constituting the control unit.

The document feeding/image reading control unit 132 achieves a smooth operation of reading out an image from a document by controlling overall the image reader unit 4, which is composed of the ADF 8 and the scanner 10. The document feeding/image reading control unit 132 also receives various settings through the operation panel 102. The document feeding/image reading control unit 132, as shown in FIG. 8A, internally includes a management level holding unit 132A that holds information that indicates whether the management level specified by the user on the display screen shown in FIG. 6A of the operation panel 102 is "important document (management level 1)" or "ordinary document (management level 0)". The document feeding/image reading control unit 132, as shown in FIG. 8A, further includes a management level information storing unit 132B that stores management level information that is to be written into the sheet tag of the tagged recording sheet on which the document specified by the user as "important document" is to be copied.

Figure 8B:
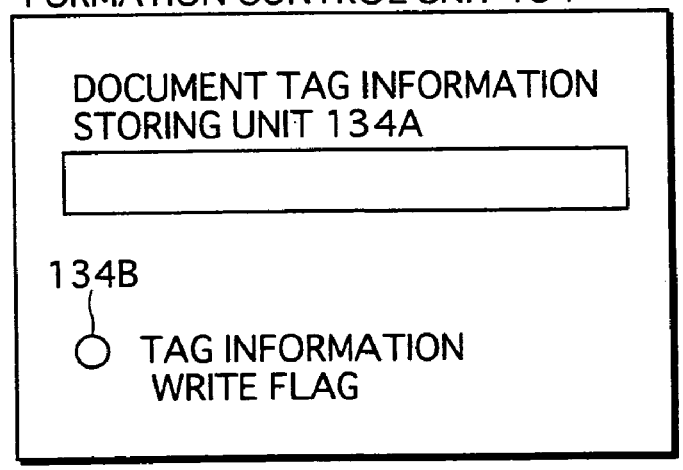
FIG. 8B shows a document tag information storing unit and a tag information write flag that are included in a sheet transport/image formation control unit constituting the control unit.

Back to FIG. 7, the sheet transport/image formation control unit 134 controls the ON/OFF of the document tag readers 84 and 86, the first tray sheet tag readers 90 and 92, and the second tray sheet tag readers 94 and 96, and by referring to the detection results of the tag readers, controls overall the printer unit 6 to achieve a smooth image forming operation. The sheet transport/image formation control unit 134, as shown in FIG. 8B, internally includes a document tag information storing unit 134A that temporarily stores the tag information read out from the document tag. The sheet transport/image formation control unit 134 writes necessary information into the sheet tag 88 of the tagged recording sheet S via the tag writers 98 and 100. The sheet transport/image formation control unit 134 further includes internally a tag information write flag 134B that is set to ON when the information is written into the sheet tag 88.

Back to FIG. 7, upon receiving the image data from the scanner 10 via an image bus line 138, the image processing unit 136, as described earlier, performs various data processes such as the shading onto the received image data, converts the image data into image data having reproduction colors of Y, M, C, and K, and stores the converted image data into the image-processing data recording unit 140. The image processing unit 136 reads image data from the image-processing data recording unit 140, and generates drive signals for the LED arrays 40Y-40K (FIG. 1) provided in the image forming units 50Y-50K, based on the read-out image data, and drives the LED arrays 40Y-40K.

The following describes the processes performed by the control unit 130 with respect to the flowcharts shown in FIGS. 9-12, such as the process of selecting a recording sheet type for the image formation, and the process of writing the document management level information into the sheet tag of a tagged recording sheet.

Figure 9:
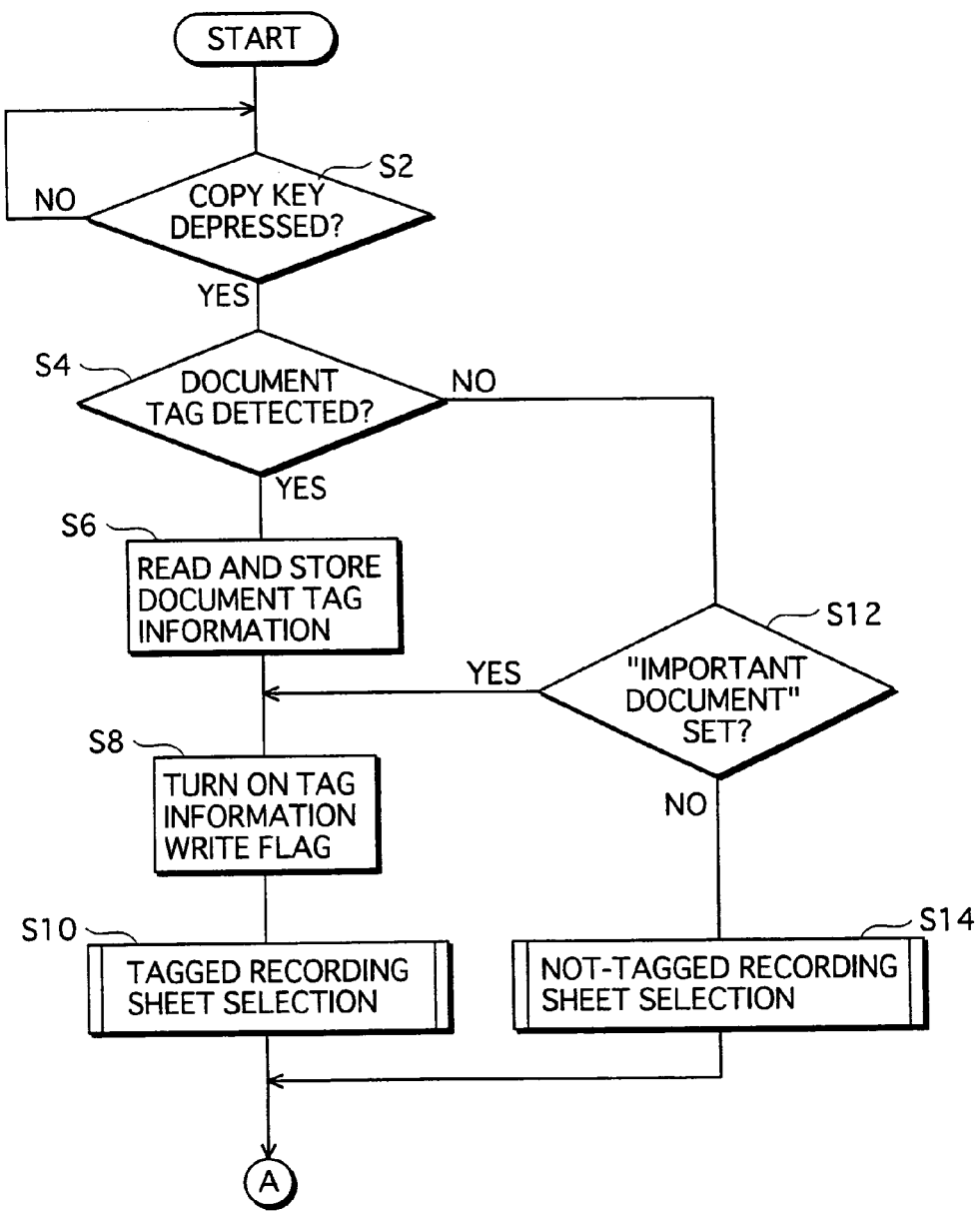
FIG. 9 is part of a flowchart showing the procedure of a process executed by the control unit.

As shown in FIG. 9, upon receiving a notification from the document feeding/image reading control unit 132 that the copy key was depressed (YES in step S2), the sheet transport/image formation control unit 134 detects a document tag by activating the document tag readers 84 and 86 (step S4).

If a document tag is detected (YES in step S4), the sheet transport/image formation control unit 134 reads out the tag information from the document tag, and stores the tag information into the document tag information storing unit 134A (FIG. 8B) (step S6), and activates the tag information write flag 134B (FIG. 7) (step S8) and goes to the tagged recording sheet selection process (step S10). With this construction, for a tagged document, a tagged recording sheet is selected without fail.

On the other hand, if a document tag is not detected in step S4 (NO in step S4), the sheet transport/image formation control unit 134 refers to the management level holding unit 132A (FIG. 8A) of the document feeding/image reading control unit 132 to judge which of "important document" and "ordinary document" is set (step S12).

If "important document" is set (YES in step S12), the control goes to steps. S8 and S10. With this construction, even if the target document is a not-tagged document (NO in step S4), the control moves, if the user desires, to a process in which a tagged recording sheet is selected and the tag information (document management level information) is written into the sheet tag thereof.

If "ordinary document" is set (NO in step S12), the control goes to the not-tagged recording sheet selection process (step S14).

Figure 10:
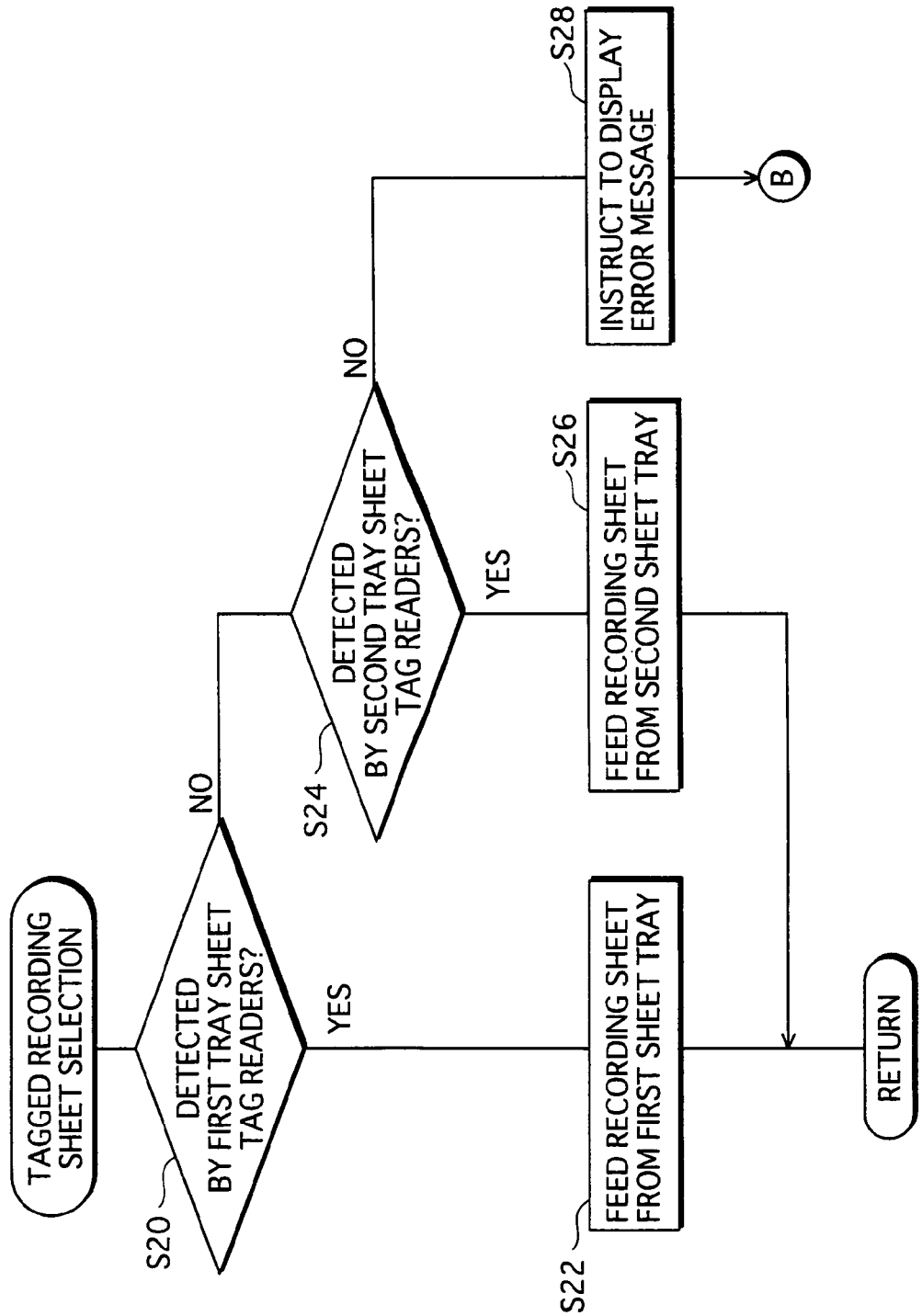
FIG. 10 is part of a flowchart showing the procedure of a process executed by the control unit.

FIG. 10 is a flowchart showing the procedure of the tagged recording sheet selection process (step S10).

The sheet transport/image formation control unit 134 first attempts to detect a sheet tag using the first tray sheet tag readers 90 and 92 (FIGS. 1 and 7) (step S20). If a sheet tag is detected (YES in step S20), the sheet transport/image formation control unit 134 activates the first pickup motor 65 (FIG. 7) to feed a tagged recording sheet from the first sheet tray 60 (FIG. 1) (step S22).

If a sheet tag is not detected by the first tray sheet tag readers 90 and 92 (NO in step S20), the sheet transport/image formation control unit 134 attempts to detect a sheet tag using the second tray sheet tag readers 94 and 96 (FIGS. 1 and 7) (step S24). If a sheet tag is detected (YES in step S24), the sheet transport/image formation control unit 134 activates the second pickup motor 67 (FIG. 7) to feed a tagged recording sheet from the second sheet tray 62 (FIG. 1) (step S26).

With the above-described processes of steps S20, S22, S24, and S26, a tagged recording sheet is selected without fail if the tagged recording sheet is stored in any of the first sheet tray 60 and the second sheet tray 62. That is to say, the user can store tagged recording sheets in any sheet tray without being conscious of which sheet tray is for storing tagged recording sheets.

Figure 12:
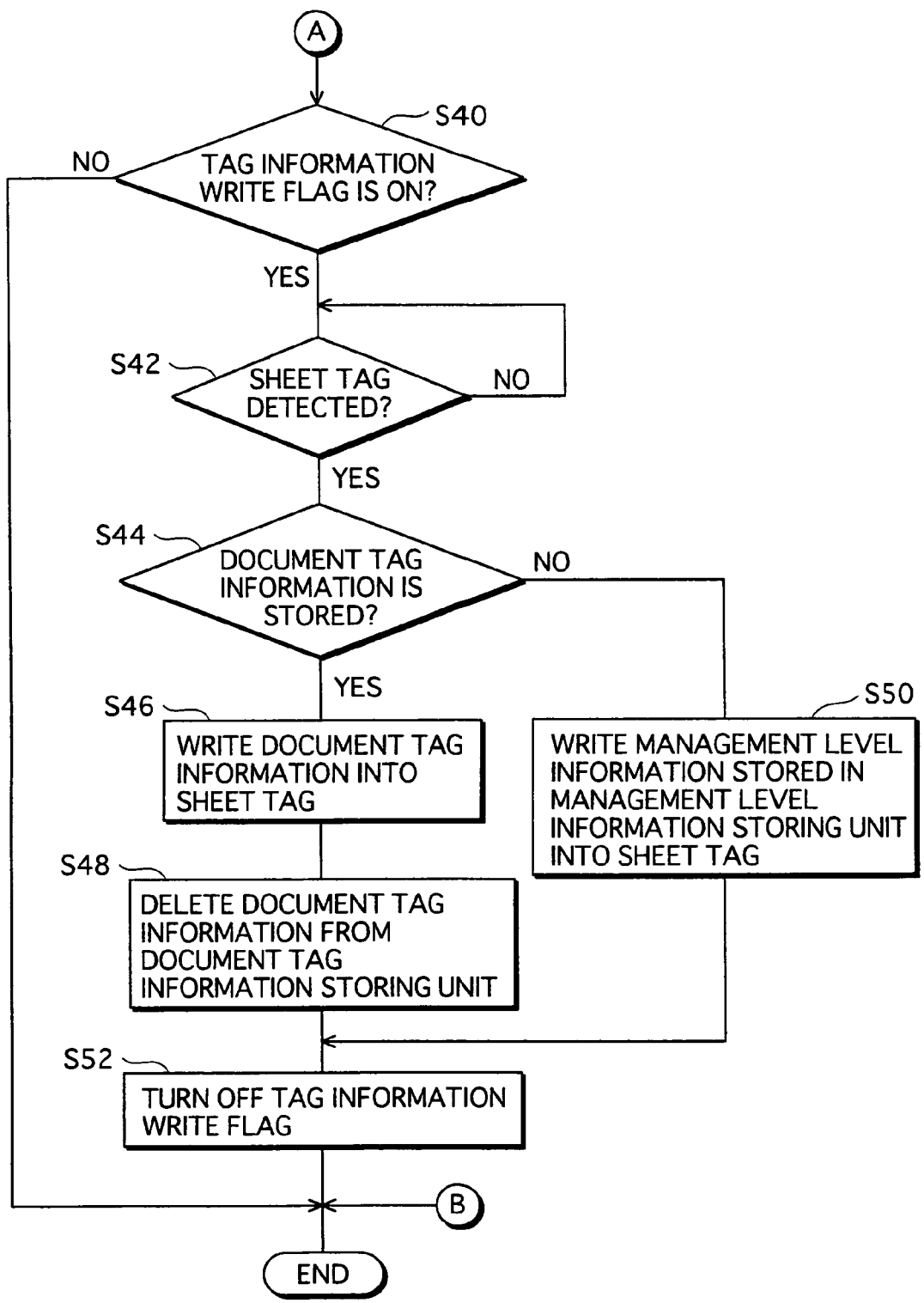
FIG. 12 is part of a flowchart showing the procedure of a process executed by the control unit.

If a sheet tag is not detected by any of the sheet tag readers (NO in both steps S20 and S24), which means that none of the sheet trays stores a tagged recording sheet, the sheet transport/image formation control unit 134 instructs the document feeding/image reading control unit 132 to display an error message that conveys the same (step S28), and ends the whole process (FIG. 12). Upon receiving the above-mentioned instruction from the sheet transport/image formation control unit 134, the document feeding/image reading control unit 132 displays and error message "no tagged recording sheet is stored" on the liquid crystal touch panel 104 of the operation panel 102.

Figure 11:
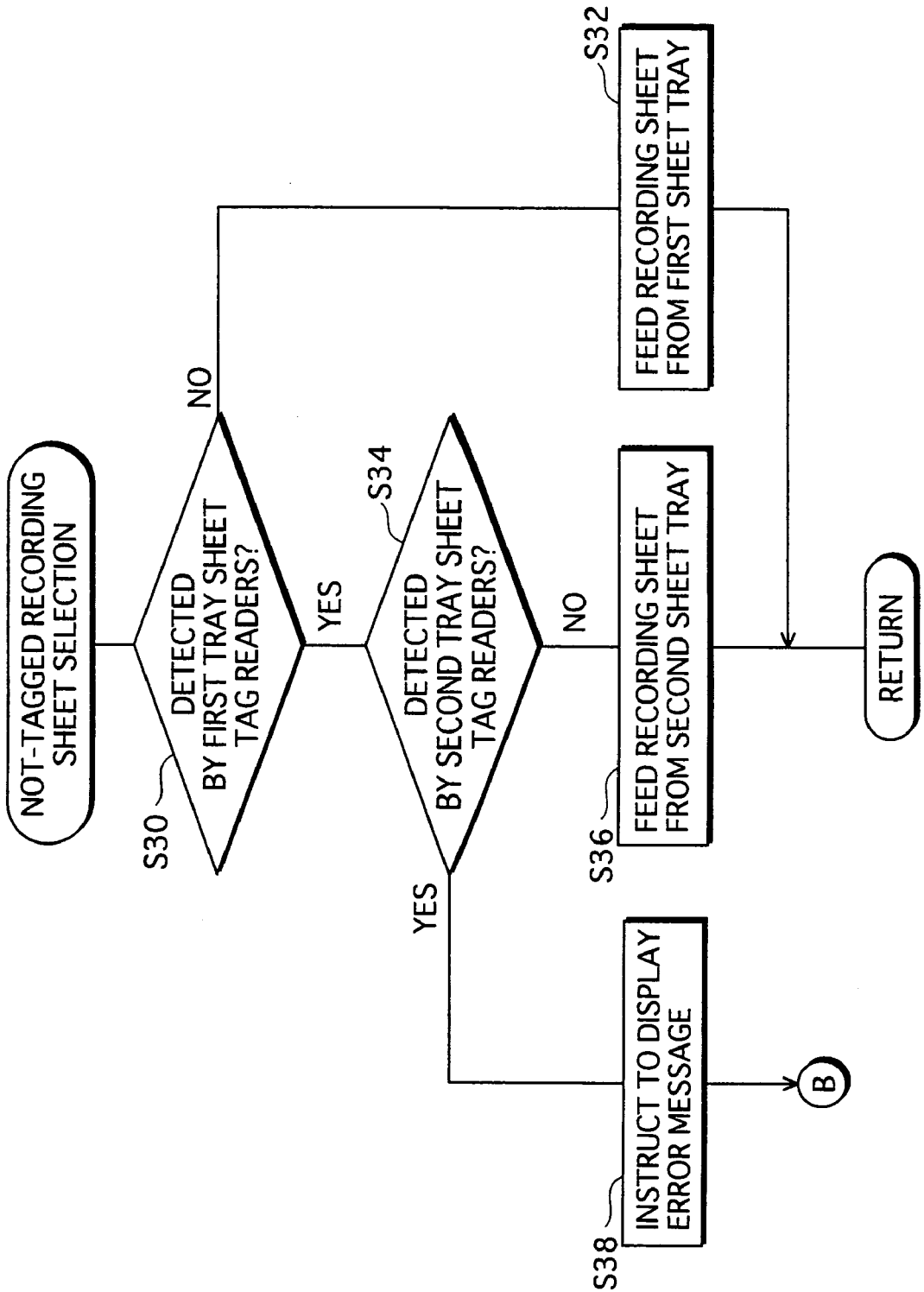
FIG. 11 is part of a flowchart showing the procedure of a process executed by the control unit.

FIG. 11 is a flowchart showing the procedure of the not-tagged recording sheet selection process (step S14).

The sheet transport/image formation control unit 134 first attempts to detect a sheet tag using the first tray sheet tag readers 90 and 92 (FIGS. 1 and 7) (step S30). If a sheet tag is not detected (NO in step S30), the sheet transport/image formation control unit 134 assumes that a not-tagged recording sheet is stored in the first sheet tray 60 (FIG. 1), and activates the first pickup motor 65 (FIG. 7) to feed a not-tagged recording sheet from the first sheet tray 60 (step S32).

If a sheet tag is detected by the first tray sheet tag readers 90 and 92 (YES in step S30), the sheet transport/image formation control unit 134 attempts to detect a sheet tag using the second tray sheet tag readers 94 and 96 (FIGS. 1 and 7) (step S34). If a sheet tag is not detected (NO in step S34), the sheet transport/image formation control unit 134 assumes that a not-tagged recording sheet is stored in the second sheet tray 62 (FIG. 1), and activates the second pickup motor 67 (FIG. 7) to feed a not-tagged recording sheet from the second sheet tray 62 (step S36).

With the above-described processes of steps S30, S32, S34, and S36, a not-tagged recording sheet is selected without fail if the not-tagged recording sheet is stored in any of the first sheet tray 60 and the second sheet tray 62.

If a sheet tag is detected by both sheet tag readers (YES in both steps S30 and S34), which means that none of the sheet trays stores a not-tagged recording sheet, the sheet transport/image formation control unit 134 instructs the document feeding/image reading control unit 132 to display an error message that conveys the same (step S38), and ends the whole process (FIG. 12). Upon receiving the above-mentioned instruction from the sheet transport/image formation control unit 134, the document feeding/image reading control unit 132 displays and error message "not-tagged recording sheets are not stored" on the liquid crystal touch panel 104 of the operation panel 102.

After either a tagged or a not-tagged recording sheet is selected in the above-described processes, the control goes to steps of the flowchart shown in FIG. 12.

The sheet transport/image formation control unit 134 first checks whether or not the tag information write flag 134B (FIG. 7) is ON (step S40).

If the tag information write flag is OFF (NO in step S40), which means that a not-tagged recording sheet has been selected, the sheet transport/image formation control unit 134 ends the processes shown in FIGS. 9-12. In this case, the image read out from the document is formed onto a not-tagged recording sheet.

On the other hand, if the tag information write flag is ON (YES in step S40), the sheet transport/image formation control unit 134 activates the tag writers 98 and 100 and checks whether or not a sheet tag of the transported tagged recording sheet is detected (step S42).

If a sheet tag is detected (YES in step S42), the sheet transport/image formation control unit 134 checks whether or not the document tag information is stored in the document tag information storing unit 134A (FIG. 8B) (step S44).

If the document tag information is stored (YES in step S44), the sheet transport/image formation control unit 134 reads out the document tag information, and writes the read-out document tag information into the sheet tag detected in step S42 (step S46). This enables the document tag information to continue in the sheet tag.

After the document tag information has been written into the sheet tag, the sheet transport/image formation control unit 134 deletes the document tag information from the document tag information storing unit 134A (step S48).

If the document tag information is not stored in the document tag information storing unit 134A (NO in step S44), the sheet transport/image formation control unit 134 reads out the management level information from the management level information storing unit 132B (FIG. 8A) of the document feeding/image reading control unit 132, and writes the read-out management level information into the sheet tag detected in step S42 (step S50). This enables the document management level information to be written to a tagged recording sheet, even if an image read out from a not-tagged document is formed on the tagged recording sheet.

After step S48 or step S50 is completed, the tag information write flag 134B (FIG. 8B) is turned OFF (step S52), and the whole process is ended.

Up to now, the present invention has been explained through an embodiment thereof. However, the present invention is not limited to the embodiment, but may take any of the following forms.

(1) In the above-described embodiment, if an image is read out from a tagged document, a tagged recording sheet is selected regardless of the setting specified on the operation panel (regardless of whether the target document is an important document or an ordinary document) (see FIG. 9), and the management level information read out from the document tag is written to the tagged recording sheet. That is to say, in the embodiment, a recording sheet is selected by prioritizing the management level information acquired from the document tag (whether or not the document tag is attached), over the management level information acquired via the operation panel. However, conversely, a recording sheet may be selected by prioritizing the management level information acquired via the operation panel over the management level information acquired from the document tag (whether or not the document tag is attached).

Figure 13:
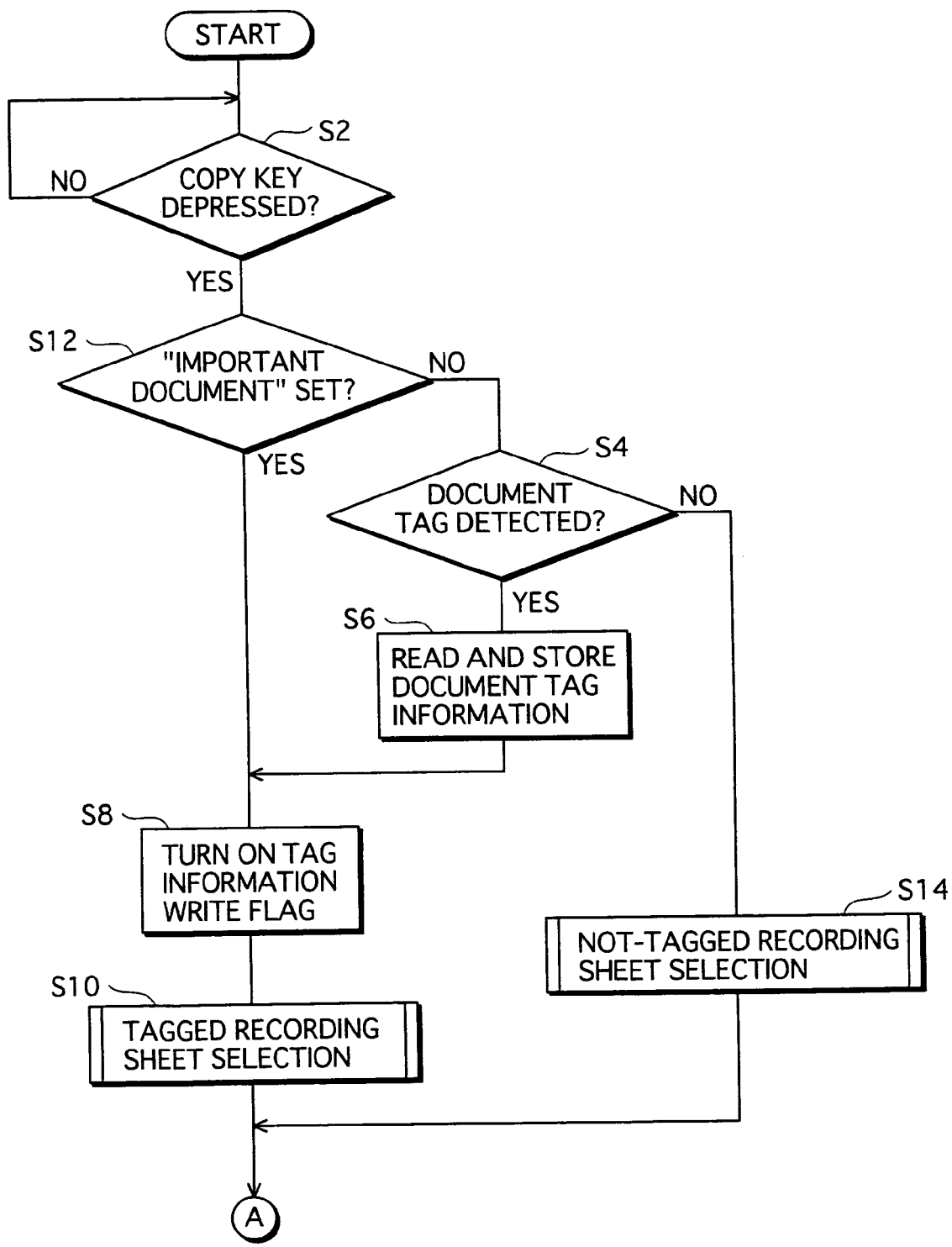
FIG. 13 is part of a flowchart showing the procedure of a process executed by the control unit, in a modification to the embodiment.

This process is performed in accordance with the flowchart shown in FIG. 13, instead of the flowchart shown in FIG. 9. The following describes the flowchart shown in FIG. 13 which is composed of the same steps shown in FIG. 9, but differs from FIG. 9 in the order of the steps. Accordingly, the same step numbers are applied to steps corresponding to FIG. 9, and the contents of each step will be described only briefly.

In the flowchart shown in FIG. 13, if "important document" is set on the operation panel (YES in step S12), a tagged recording sheet is selected without detecting the document tag (step S10). Then the management level information read out from the management level information storing unit 132B (FIG. 8A) is written to the sheet tag (step S50).

With this construction, even if the target document is a tagged document, it is possible to write the management level information that is different from the management level information stored in the document tag of the target document, namely the management level information stored in the management level information storing unit 132B, to the sheet tag of a tagged recording sheet.

(2) In the above-described embodiment, the document security is managed using two management levels which are determined based on whether or not the contactless IC tag is attached to the document. However, not limited to the two levels, a plurality of management levels may be used for managing the document security.

The following shows an example in which four management levels are used. In this case, two levels "intermediately important" (management level 2) and "very important" (management level 3), which are higher than "important" (management level 1) in the security level, are added to the management level information. Each document tag holds any one of the three types of management level information for management of the document security. Not-tagged documents are managed as management level 0, as in the above-described embodiment.

Figure 2B:
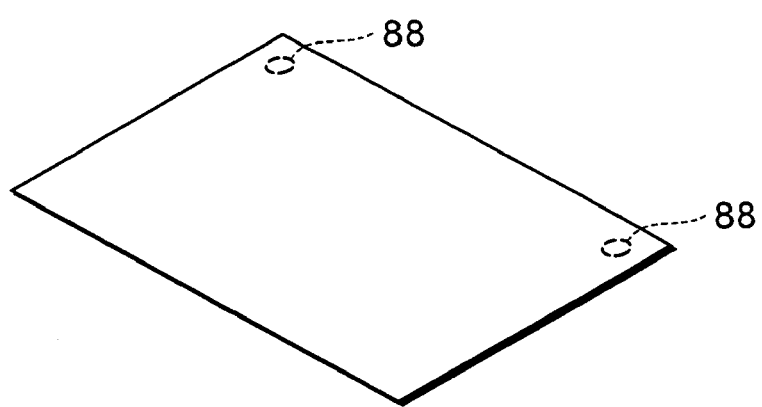
FIGS. 2B and 2C show tagged recording sheets used in the modifications of the embodiment.
Figure 2C:
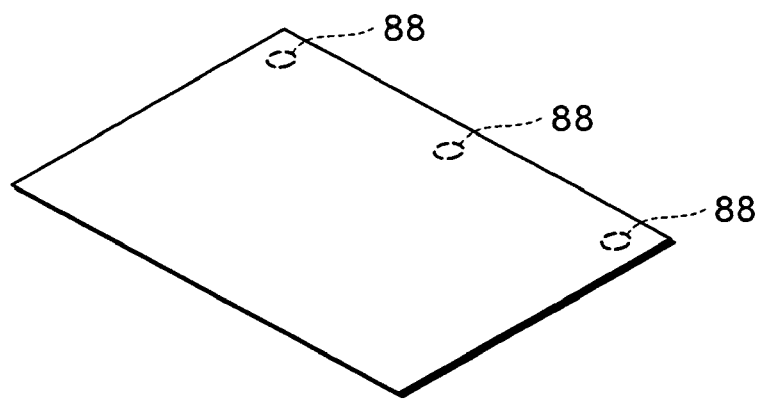

In line with the above-described construction, the number of types of recording sheets increases. That is to say, in addition to the recording sheet type that has one sheet tag 88 as shown in FIG. 2A, the following two types of recording sheets are used as well: a recording sheet type that has two sheet tags as shown in FIG. 2B; and a recording sheet type that has three sheet tags as shown in FIG. 2C.

Also, two sheet trays are added (not illustrated). Also, in each of the four sheet trays, a sheet tag reader is added as indicated by the dashed line in FIG. 4 (sheet tag readers 142 and 144) so that each sheet tray has three sheet tag readers. The three sheet tag readers are used to detect sheet tags. And from the number of detected sheet tags, the type of the recording sheet is detected, and the sheet tray storing the recording sheet is further detected.

Similarly, a tag writer for writing the management level information to the sheet tag is added as indicated by the dashed line (sheet tag reader 146) in FIG. 4.

A recording sheet attached with one sheet tag is selected if the management level information read out from the document tag of a tagged document is "important"; a recording sheet attached with two sheet tags is selected if the read-out management level information is "intermediately important"; and a recording sheet attached with three sheet tags is selected if the read-out management level information is "very important". A not-tagged recording sheet is selected in correspondence with a not-tagged document.

The reason for increasing the number of contactless IC tags in the recording sheet as the security level increases is to assure that the management level information read out from the document is written to the recording sheet even if any contactless IC tags become defective.

Figure 6B:
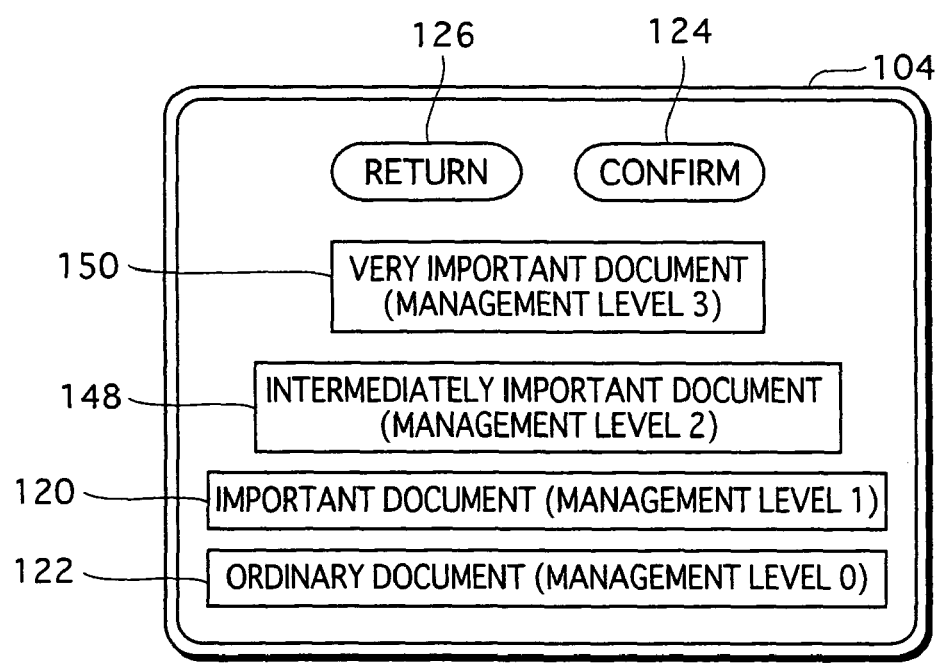
FIG. 6B shows an example of the display screen in a modification of the embodiment.

The added "intermediately important" (management level 2) and "very important" (management level 3) may be set on the operation panel. FIG. 6B shows the display screen of the liquid crystal touch panel 104 on which these settings can be performed. As shown in FIG. 6B, the display screen additionally has an intermediately important document key 148 and a very important document key 150. The screen shown in FIG. 6B, as the screen shown in FIG. 6A, is displayed when the "management level setting key" is depressed on the basic screen (FIG. 5).

The management level holding unit 132A (FIG. 8A) holds information that indicates which, among "ordinary document", "important document", "intermediately important document", and "very important document", is the management level specified by the user on the display screen shown in FIG. 6B of the operation panel 102. The management level information storing unit 132B stores management level information that is to be written into the sheet tag of the tagged recording sheet on which the document is to be copied in correspondence with the management level specified by the user, selected from among the four management levels.

When the document management level is set on the operation panel, a not-tagged recording sheet is selected if the management level holding unit 132A stores "ordinary document"; a recording sheet attached with one sheet tag is selected if the management level holding unit 132A stores "important"; a recording sheet attached with two sheet tags is selected if the management level holding unit 132A stores "intermediately important"; and a recording sheet attached with three sheet tags is selected if the management level holding unit 132A stores "very important". When a tagged recording sheet is selected, the management level information stored in the management level information storing unit 132B that corresponds to the management level held by the management level holding unit 132A is written into the sheet tag of the selected recording sheet.

An IC tag reader (document tag reader 152) may be added as indicated by the dashed line in FIG. 3 to prepare for the case where the recording sheet shown in FIG. 2C, on which an image is formed, is used as a document from which the image is to be read out.

(3) Up to now, the management level acquired from the document is determined based on whether or not the document tag is attached to the document, or is determined by the management level information held by the document tag. However, not limited to this, the management level may be acquired from a bar code printed in an area of the document surface that does not overlap the image on the document, or from a tint block that is printed over the image on the document. That is to say, the management level is expressed by the bar code or the tint block, and the management level information is acquired by causing the scanner to read the bar code or the tint block together with the image on the document.

The technology for extracting the tint block pattern from the read-out image is known from the disclosure of, for example, Japanese Patent Application Publication No. 2001-197297, No. 2004-202068, and No. 2004-228897.

(4) In the above-described embodiment, two constructions, namely a construction using the document tag reader and a construction using the operation panel, are provided as means for acquiring the management level information from the document. However, not limited to this, only the construction using the document tag reader may be provided. Such a construction excludes human errors that may occur in selecting a type of recording sheet.

(5) In the above-described embodiment, IC tag readers 90, 92, 94, and 96 are provided to detect, with certainty, whether or not each recording sheet stored in the sheet trays 60 and 62 is attached with an IC tag. However, it may be set from the operation panel or the like whether or not each recording sheet stored in the sheet trays 60 and 62 is attached with an IC tag, and a recording sheet to be fed may be selected in accordance with the setting.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming device for reading out an image from a document and forming the read-out image on a recording sheet, comprising:
- a management level information acquiring unit operable to acquire management level information of the document;
- a storing unit operable to separately store different types of recording sheets that respectively correspond to different document management levels;
- a judging unit operable to judge whether the management level information acquired by the management level information acquiring unit corresponds to a first management level according to which the document is a not-tagged document to which a contactless IC tag is not attached or a second management level according to which the document is a tagged document to which a contactless IC tag is attached; and
- a recording sheet selecting unit operable to select a first type of recording sheet corresponding to the first management level in the case that the management level information is judged to be the first management level, and to select a second type of recording sheet corresponding to the second management level in the case that the management level information is judged to be the second management level, wherein
- the second management level includes a plurality of management levels, and the storing unit is operable to store a plurality of types of recording sheets, each of the plurality of types of recording sheets having a different number of contactless IC tags in correspondence with the plurality of management levels included in the second management level, and
- the recording sheet selecting unit is operable to output a type of recording sheet having a greater number of contactless IC tags when a higher management level is detected in the second management level.

2. A recording sheet selection method for an image forming device that includes a storing unit operable to separately store different types of recording sheets that respectively correspond to different document management levels, reads out an image from a document and forms the read-out image on a recording sheet selected from among the recording sheets stored in the storing unit, the recording sheet selection method comprising:
- a management level information acquiring step to acquire, by the image forming device, management level information of the document;
- a judging step to judge, by the image forming device, whether the management level information acquired by the management level information acquiring unit corresponds to a first management level according to which the document is a not-tagged document to which a contactless IC tag is not attached or a second management level according to which the document is a tagged document to which a contactless IC tag is attached; and
- a recording sheet selecting step to select, by the image forming device, a first type of recording sheet corresponding to the first management level in the case that the management level information is judged to be the first management level, and to select, by the image forming device, a second type of recording sheet corresponding to the second management level in the case that the management level information is judged to be the second management level, wherein
- the second management level includes a plurality of management levels, and the storing unit stores a plurality of types of recording sheets, each of the plurality of types of recording sheets having a different number of contactless IC tags in correspondence with the plurality of management levels included in the second management level, and
- in the recording sheet selecting step, a type of recording sheet having a greater number of contactless IC tags is outputted when a higher management level is detected in the second management level.

3. The image forming device of claim 1 further comprising a document transport unit operable to transport a document tray and the document set on the document tray to a document reading position along a document transport path, wherein
the management level information acquiring unit is disposed in a vicinity of either the document tray or the document transport path.

4. The image forming device of claim 1, wherein
the first type of recording sheet is a not-tagged recording sheet to which a contactless IC tag is not attached and the second type of recording sheet is a tagged recording sheet to which a contactless IC tag is attached.

5. The image forming device of claim 4 further comprising a tag information writing unit operable to, when the recording sheet selecting unit outputs a tagged recording sheet, write tag information to the contactless IC tag attached to the tagged recording sheet, wherein
the management level information acquiring unit can read tag information held by the contactless IC tag attached to the tagged document.

6. The image forming device of claim 4, wherein
the storing unit includes
a sheet tag detecting unit operable to detect, for each sheet tray, whether or not a contactless IC tag is attached to recording sheets set in sheet trays, wherein,
in the second management level, the recording sheet selecting unit is operable to output a recording sheet as the second type of recording sheet from a sheet tray that is detected by the sheet tag detecting unit to hold recording sheets to which contactless IC tags are attached.

* * * * *